(12) United States Patent
Mitani

(10) Patent No.: US 7,652,829 B2
(45) Date of Patent: Jan. 26, 2010

(54) LENS BARREL AND IMAGE PICKUP APPARATUS

(75) Inventor: Yoshifumi Mitani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/974,589

(22) Filed: Oct. 15, 2007

(65) Prior Publication Data
US 2008/0094729 A1    Apr. 24, 2008

(30) Foreign Application Priority Data
Oct. 20, 2006    (JP) ............................. 2006-285784

(51) Int. Cl.
*G02B 15/14* (2006.01)
(52) U.S. Cl. ...................... 359/699; 359/700
(58) Field of Classification Search ......... 359/817–824, 359/699–700
See application file for complete search history.

(56) References Cited

U.S. PATENT DOCUMENTS

| | | | |
|---|---|---|---|
| 5,636,062 A * | 6/1997 | Okuyama et al. ........... | 359/700 |
| 6,011,927 A * | 1/2000 | Kamata ....................... | 396/55 |
| 6,134,057 A | 10/2000 | Ueyama et al. | |
| 6,618,212 B2 | 9/2003 | Chikami et al. | |
| 2005/0168847 A1* | 8/2005 | Sasaki ......................... | 359/823 |
| 2006/0181748 A1* | 8/2006 | Makii et al. ................. | 358/500 |

FOREIGN PATENT DOCUMENTS

| | | |
|---|---|---|
| JP | 11-95082 | 4/1999 |
| JP | 2002-189165 | 7/2002 |
| JP | 2005-352236 | 12/2005 |

* cited by examiner

*Primary Examiner*—Ricky L Mack
*Assistant Examiner*—Vipin M Patel
(74) *Attorney, Agent, or Firm*—Brinks Hofer Gilson & Lione

(57) ABSTRACT

In a lens barrel having an image pickup optical system including a first lens frame held movably in the optical axis direction for holding at least one lens and a second lens frame held movably in the optical axis direction for holding at least one lens, the first lens frame has a movable member which moves in the direction perpendicular to the optical axis in correspondence with the movement of the first lens frame in the optical axis direction, and has a cam connection with the second lens frame, thus the second lens frame moves in correspondence with the movement of the first lens frame in the optical axis direction.

21 Claims, 14 Drawing Sheets

LENS BARREL AND IMAGE PICKUP APPARATUS

This application is based on Japanese Patent. Application No. 2006-285784 filed on Oct. 20, 2006, in Japanese Patent Office, the entire content of which is hereby incorporated by reference.

TECHNICAL FIELD

The present invention relates to a lens barrel and an image pickup apparatus.

BACKGROUND

Conventionally, using the coupling between pins fixed to lens frames (a moving frame) of lenses and cam grooves formed in a plurality of cylindrical members telescopically fit, the lenses are driven in the optical axis direction.

However, in such a cam mechanism, even if it is intended to make smaller the cylindrical members with the cam grooves formed on them and the parts such as pins engaged to them, there are limitations on processing and assembling, thus a problem arises that the miniaturization of the cam mechanism cannot follow the miniaturization of the optical system.

Further, in the cam mechanism aforementioned, there is installed an inclination control mechanism for preventing each lens moving back and forth in the optical axis direction from being inclined to the optical axis, however, it is difficult to prevent inclination of the lenses because the moving frame for holding the lenses moves back and forth while rotating around the optical axis, and the span of the inclination control mechanism cannot be long enough when intending to miniaturize a plurality of moving frames by avoiding the mutual interference.

Therefore, a cylindrical drive shaft having a spiral thread on the outer peripheral surface thereof is arranged in parallel with the optical axis of the lenses, and a thread coupled to the thread of the drive shaft is formed on the lens frame, and the lenses are moved in the optical axis direction by the rotation of the drive shaft. In this case, it is necessary to prevent inclination of the optical axis and displacement thereof and for that purpose, and it is general to install a guide shaft in parallel with the optical axis of the lenses and to form a through hole passing through the guide shaft in the lens frame so as to support movably the lens frame by the guide shaft. By use of this constitution, the lens barrel is not restricted on its shape, and a drive section for rotating the drive shaft can be arranged in the lens barrel together with the drive shaft and guide shaft, thus the size as a whole can be controlled easily.

In recent years, by use of, adding to such a constitution, a bending optical system for bending the optical axis of the imaging optical system by a mirror or a prism, thinning of a camera (miniaturization in a depth direction) has been realized (for example, refer to Japanese Laid-Open Patent Publication 2005-352236).

Further, a method for driving a moving lens in the optical axis direction using a linear drive mechanism using an electro mechanical element such as a piezo element is also employed. (For example, refer to U.S. Pat. No. 6,134,057.)

However, in the lens drive mechanism disclosed in U.S. Pat. No. 6,134,057, the lens frames for holding two lens groups are driven independently to optional positions by the linear drive mechanism, so that particularly when zooming, it is necessary to detect the position of each lens frame with high precision. Therefore, a sensor for detecting a highly precise position and a signal processor are necessary, which causes obstacles to miniaturization. To solve such a problem, a method for interlocking and driving two lenses by a plate cam mechanism is disclosed (for example, refer to U.S. Pat. No. 6,618,212) focusing attention on the relationship that is uniquely decided between the imaging magnification and the positional relationship between the two lens groups.

However, in the constitution of U.S. Pat. No. 6,618,212, the two lens groups are driven by the plate cam mechanism, and a cam in a size corresponding to the moving distance of the lenses is necessary, thus the cam mechanism becomes larger, which causes obstacles to realization of miniaturization and lightweight.

SUMMARY

The present invention was developed in view of the foregoing problems and is intended to provide a small and light lens barrel and a small and light image pickup apparatus capable of moving one lens group in correspondence with movement of the other lens group. In view of forgoing, one embodiment according to one aspect of the present invention is a lens barrel comprising:

an image pickup optical system; the optical system including:
  a first lens group; and
  a second lens group,
  a first lens holder for holding the first lens group, the first lens holder being able to move in a direction of an optical axis of the first lens group;
  a second lens holder for holding the second lens group, the second lens holder being able to move in the direction of the optical axis; and
  a movable member which is held by the first lens holder so as to be movable in a direction perpendicular to the optical axis and is coupled to the second lens holder by a cam mechanism.

According to another aspect of the present invention, another embodiment is an image pickup apparatus, comprising:

an image pickup optical system for picking up an image of a subject; the optical system including:
  a first lens group; and
  a second lens group,
  an image pickup device for converting the image of the subject formed by the image pickup optical system into an electrical signal; and
  a lens barrel for holding the image pickup optical system; including:
  a first lens holder for holding the first lens group, the first lens holder being able to move in a direction of an optical axis of the first lens group;
  a second lens holder for holding the second lens group, the second lens holder being able to move in the direction of the optical axis; and
  a movable member which is held by the first lens holder so as to be movable in a direction perpendicular to the optical axis and is coupled to the second lens holder by a cam mechanism.

BRIEF DESCRIPTION OF THE DRAWINGS

FIG. 13 is a diagram showing a perspective view for explaining an example of an end face cam 4a.

DETAILED DESCRIPTION OF THE PREFERRED EMBODIMENTS

Hereinafter, the present invention will be described in detail by referring to embodiments, though the present invention is not limited to them.

Figure 1:
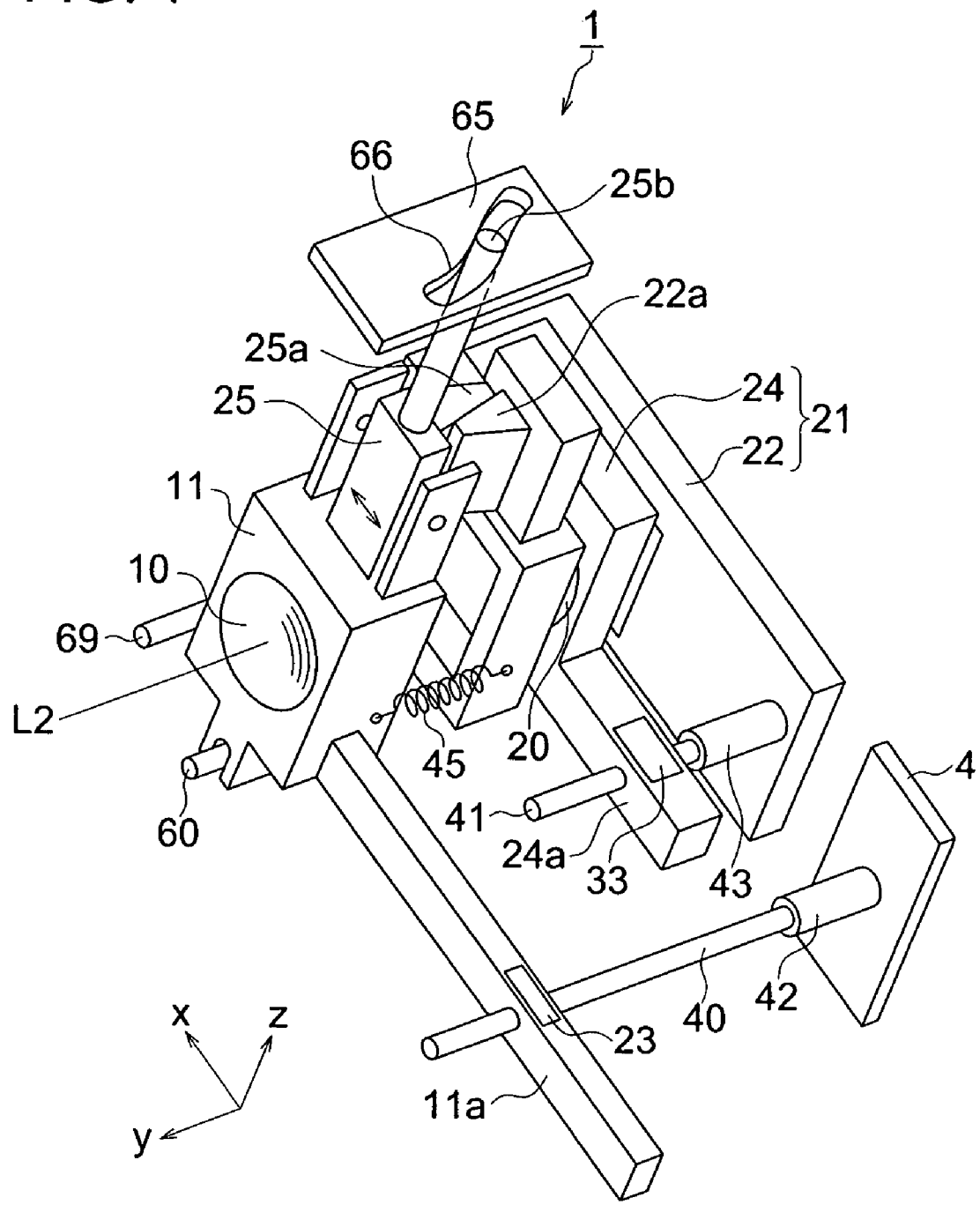
FIG. 1 is a diagram showing a perspective view of a main section of a lens barrel of a first embodiment of the present invention.
Figure 2:
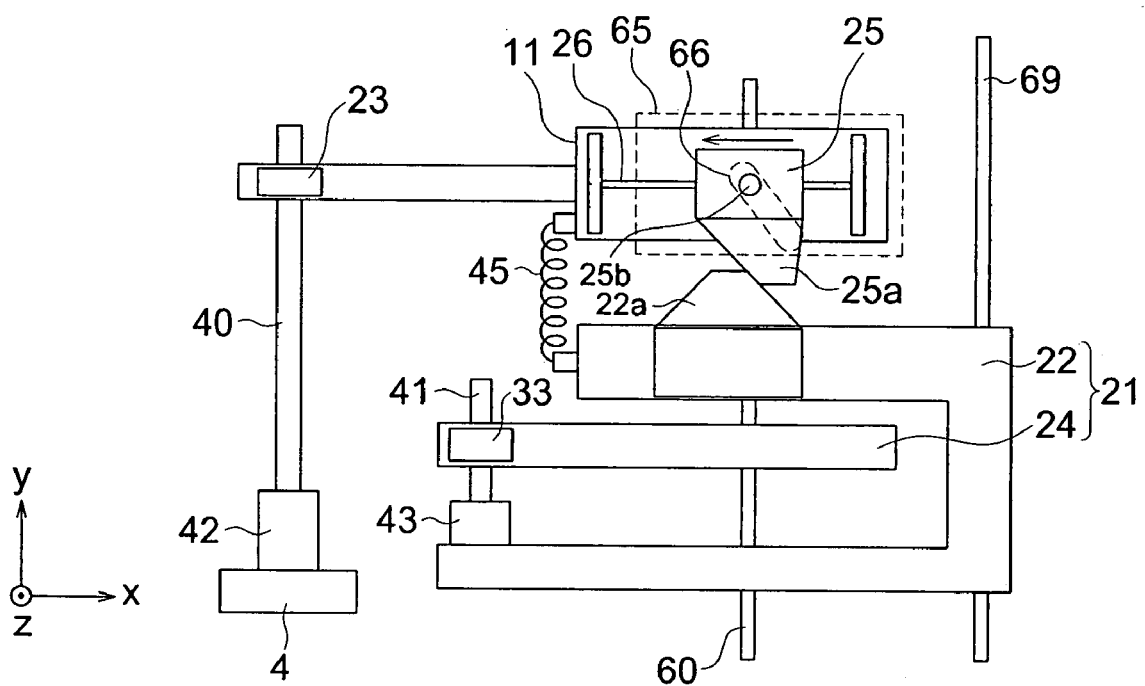
FIG. 2 is a diagram showing a plan view of the main section of the lens barrel of the first embodiment of the present invention.

FIG. 1 is a diagram showing a perspective view of an main section of a lens barrel of the first embodiment of the present invention, and FIG. 2 is a diagram showing a plan view of the main section of the lens barrel of the first embodiment of the present invention. In the following explanation, the direction is indicated by properly using the three-dimensional orthogonal coordinate system of X, Y, and Z shown in each drawing.

In FIGS. 1 and 2, numeral 10 indicates a first moving lens group, and 20 indicates a second moving lens group, and an imaging optical system is formed by an optical system including the two moving lens groups. The first moving lens group 10 is held by a first lens frame 11 and the first lens frame 11 is supported by a guide 60 and a rod 40. The first lens frame 11 is controlled in rotation by the guide 60 and is controlled in inclination by rod 40. The guide 60 is engaged also to a second lens frame 21 which will be described later and guides and supports it in the direction of an optical axis L2 (Y-axis direction).

The rod 40 is a driving force transfer section of the present invention, which is arranged in the direction of the optical axis L2 (Y-axis direction), is pressed by a plate spring 23 so as to make contact with a contact portion 11a of the first lens frame 11, and is frictionally connected with the first lens frame 11. The rod 40 is adhered and fixed to a piezo element 42 at its one end and the piezo element 42 is adhered and fixed to a fixed frame 4 of the barrel 1. The piezo element 42 is a kind of electromechanical conversion section composed of many laminated piezo sheets and is a linear actuator of the present invention. As described later in detail, a camera controller not shown in FIG. 1 drives the rod 40 in the direction of the optical axis L2 using expansion and contraction thereof in the optical axis direction by the piezo element 42 as a drive source and moves the first lens frame 11 to a predetermined position. The rod 40 and piezo element 42 is a driving member of the present invention and the rod 40 serves as a drive shaft.

As shown in FIG. 2, to the first lens frame 11, a movable member 25 supported by a guide member such as a movable member shaft 26 is attached movably along the movable member shaft 26 in the X-axis direction indicated by the arrow (the direction perpendicular to the optical axis L2). Further, a cam pin 25b (may be also referred to as a first cam follower) of the movable member 25 is engaged to a cam groove 66 of a cam plate 65 fixed to the barrel 1, so that when the first lens frame 11 moves in the direction of the optical axis L2 (the Y-axis direction), the first cam pin 25b moves along the cam groove 66 and the movable member 25 moves in the X-axis direction. The operation of the movable member 25 will be described later in detail.

The second lens frame 21 is structured of a movable frame such as a lens moving frame 24 for holding the second moving lens group 20 and a second sliding contact portion moving frame 22 having a second sliding contact portion 22a. The lens moving frame 24 is supported by a rod 41 and a sub-guide shaft 69, and the second sliding contact portion moving frame 22 is supported by the guide 60 and sub-guide shaft 69, and they can move in the direction of the optical axis L2. The lens moving frame 24 is controlled in inclination by the rod 41 and is controlled in rotation by the sub-guide shaft 69. Further, the second sliding contact portion moving frame 22 is controlled in inclination by the rod 60 and is controlled in rotation by the sub-guide shaft 69.

The rod 41 is adhered and fixed to a piezo element 43 at its end, and the piezo element 43 is adhered and fixed to the second sliding contact portion moving frame 22. Further, the other end of the rod 41 is supported by the lens barrel 1 so as to move freely in the direction of the optical axis L2 (the Y-axis direction). The rod 41 and piezo element 43 are actuators of the present invention, and the rod 41 serves as a drive shaft.

Also in the rod 41, similarly to the rod 40, a camera controller not drawn drives the rod 41 in the optical axis direction using the piezo element 43 as a drive source and moves the lens moving frame 24 to a predetermined position within the second sliding contact portion moving frame 22. The drive principle of the rod 41 which is a drive section is the same as that of the rod 40, thus the explanation thereof will be omitted.

Next, the movement of the first lens frame 11 and the second lens frame 21 at the time of zooming will be described.

Figure 3:
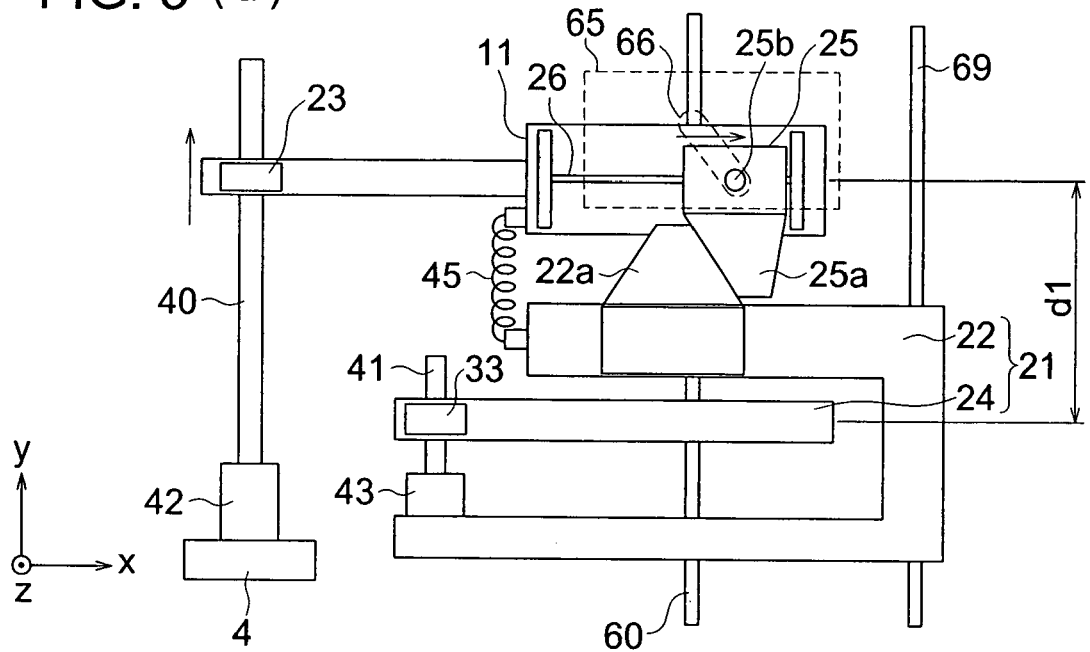
FIGS. 3(a) and 3(b) are illustrations for explaining the movement of a first moving lens group 10 and a second moving lens group 20 at the time of zooming in the first embodiment.
Figure 3:
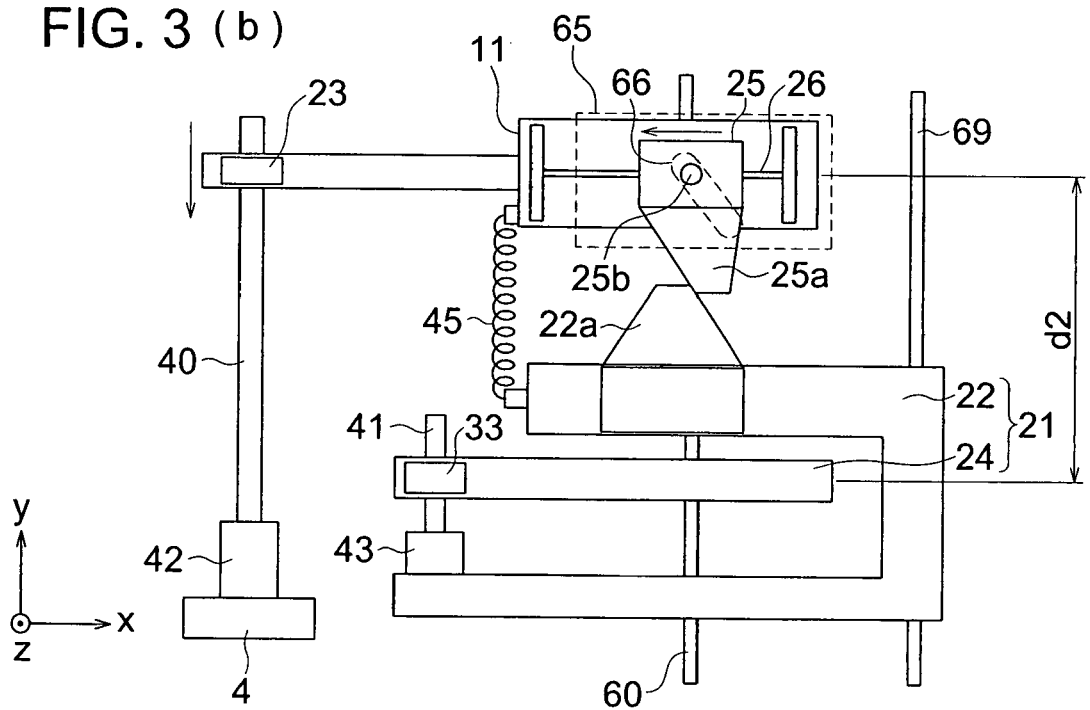

FIGS. 3(a) and 3(b) are illustrations for explaining the movement of the first lens frame 11 and second lens frame 21 at the time of zooming by the lens drive mechanism in the first embodiment. FIG. 3(a) shows the state at the wide end and FIG. 3(b) shows the state at the telephoto end.

When zooming on the wide side, the first lens frame 11 moves in the direction of the arrow, that is, in the negative direction of the Y-axis shown in FIG. 3(b). Then, the first cam pin 25b of the movable member 25 moves in the positive direction of the X-axis along the cam groove 66 and the first sliding contact portion 25a of the movable member 25 also moves in the positive direction of the X-axis. The first lens frame 11 and second lens frame 21 are pressed in the direction of mutual contact by a coil spring 45, so that the second sliding contact portion 22a slides on the sliding contact surface with the first sliding contact portion 25a and moves in the positive direction of the Y-axis. At this time, the distance between the lens centers of the first moving lens group 10 and second moving lens group 20 is d1.

When zooming on the telephoto side, the first lens frame 11 moves in the direction of the arrow, that is, in the positive direction of the Y-axis shown in FIG. 3(a). Then, the first cam pin 25b of the movable member 25 moves in the negative direction of the X-axis along the cam groove 66 and the first sliding contact portion 25a of the movable member 25 also moves in the negative direction of the X-axis. Then, force in the negative direction of the Y-axis against the pressing force of the coil spring 45 is generated on the sliding contact surface where the second sliding contact portion 22a and first sliding contact portion 25a slide and the second lens frame 21 moves in the negative direction of the Y-axis for the first lens frame 11. At this time, the distance between the lens centers of the first moving lens group 10 and second moving lens group 20 is d2, which is longer than the distance d1 on the wide side.

As described later in detail, the first lens frame 11 executes drive transfer via the frictional force with the rod 40, though the pressing force of the coil spring 45 is set so as to make the component generated when the pressing force of the coil spring 45 is converted in the direction of the optical axis L2 by the movable member 25 and cam groove 66 smaller than the frictional force held by the first lens frame 11.

As mentioned above, the first sliding contact portion 25a and second sliding contact portion 22a of the movable member 25 constitute a cam mechanism, thus the distance between the lens centers of the first moving lens group 10 and second moving lens group 20 is changed, thus the zooming magnification can be changed only by moving the first moving lens group 10. Further, the first sliding contact portion 25a and second sliding contact portion 22a of the movable member 25 are small and the degree of freedom of arrangement is large, so that the lens barrel 1 can be formed small and light in weight.

Figure 4:
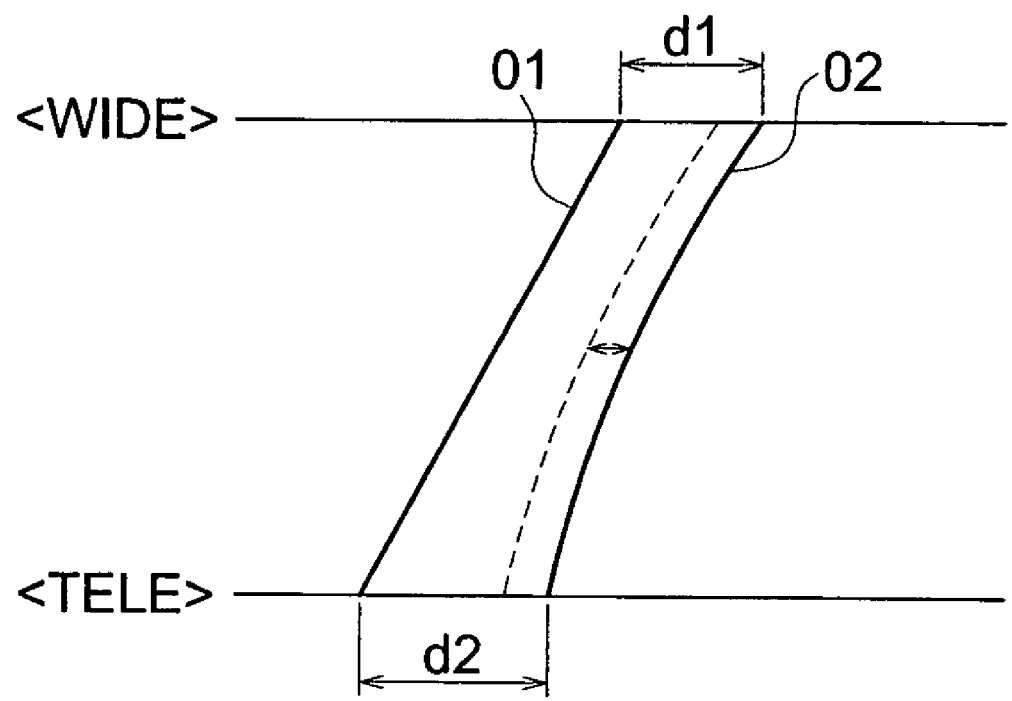
FIG. 4 is a drawing of zoom curves of the first moving lens group 10 and the second moving lens group 20.

FIG. 4 shows an example of the zoom curves of the first moving lens group 10 and second moving lens group 20 at the time of zooming. The vertical direction of this sheet of paper indicates the focal length of the imaging optical system, and the upper side of the sheet of paper is the wide side, and the lower side thereof is the telephoto side. Further, the lateral direction of the sheet of paper indicates the position on the optical axis L2 (the Y-axis direction) of each optical system at each focal length. O1 shown in the drawing indicates the position of the first moving lens group 10, and O2 indicates the position of the second moving lens group 20.

As shown in FIG. 4, the distance during zooming between the first moving lens group 10 and the second moving lens group 20 varies with the focal length. For example, the distance d2 between the first moving lens group 10 and the second moving lens group 20 at the telephoto end is longer than the distance d1 between the first moving lens group 10 and the second moving lens group 20 at the wide end. So as to change the distance between the first lens frame 11 and the second lens frame 21 in accordance with these zoom curves, the shape of the cam groove 66, the slope angles of the second sliding contact portion 22a and first sliding contact portion 25a are designed.

Further, O2 indicated by the solid line in FIG. 4 shows the state that the second moving lens group 20 is positioned so as to adjust the focus to the infinite point and when focusing in the short-distance direction, the second moving lens group 20 is moved in the direction indicated by the dotted line. The focusing is executed by a camera controller not shown by driving the rod 41 in the optical axis direction using the piezo element 43 as a drive source and moving the lens moving frame 24 to a predetermined position in the second sliding contact portion moving frame 22. Further, the zoom tracking correction is executed by driving the lens moving frame which will be described later. Further, in this embodiment, the direction indicated by the dotted line in FIG. 4 in which the second moving lens group 20 is moved is positioned on the left of O2 indicated by the solid line, though the present invention is not limited to the example and can be applied to an optical system in which the doted line is positioned on the right of O2.

In this embodiment, the lenses are designed so as to increase the movement distances of the first moving lens group 10 and second moving lens group 20 while suppressing the movement distance of the second moving lens group 20 and the variation in the distance between the first moving lens group 10 and the second moving lens group 20 at the time of focusing. By doing this, the movement distance of the first lens frame 11 with respect to the movement distance of the movable member 25 can be increased, so that the second lens frame 21 can be position-controlled with high precision, and the mechanism for driving the lens moving frame can be made smaller, and the lens barrel 1 can be formed small with high precision. Further, the movement distances of the first moving lens group 10 and second moving lens group 20 can be increased, thus the optical system can be miniaturized advantageously.

Next, the operation of the lens drive mechanism of the second embodiment of the present invention will be described. The first embodiment has a structure that the second sliding contact portion 22a of the second lens frame 21 slides on the sliding contact surface of the first sliding contact portion 25a of the movable member 25 in correspondence with the movement of the first lens frame 11 in the optical axis direction, thus the second lens frame 21 moves. On the other hand, the second embodiment is an embodiment for connecting the movable member 25 and second lens frame 21 through a second cam pin 25d and a cam groove 59. Hereinafter, by referring to FIGS. 5(a) and 5(b), the constitution and operation of the lens drive mechanism will be described, though the same numerals are assigned to the functional elements described so far, and the explanation thereof will be omitted.

Figure 5:
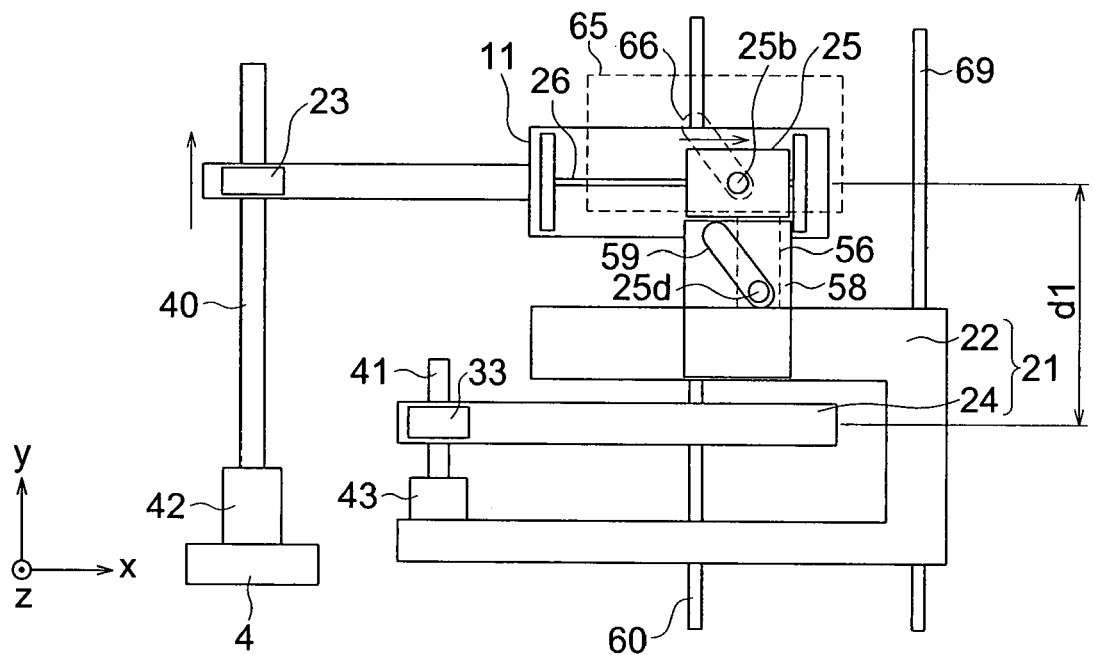
FIGS. 5(a) and 5(b) are illustrations for explaining the movement of the first moving lens group 10 and second moving lens group 20 at the time of zooming in a second embodiment.
Figure 5:
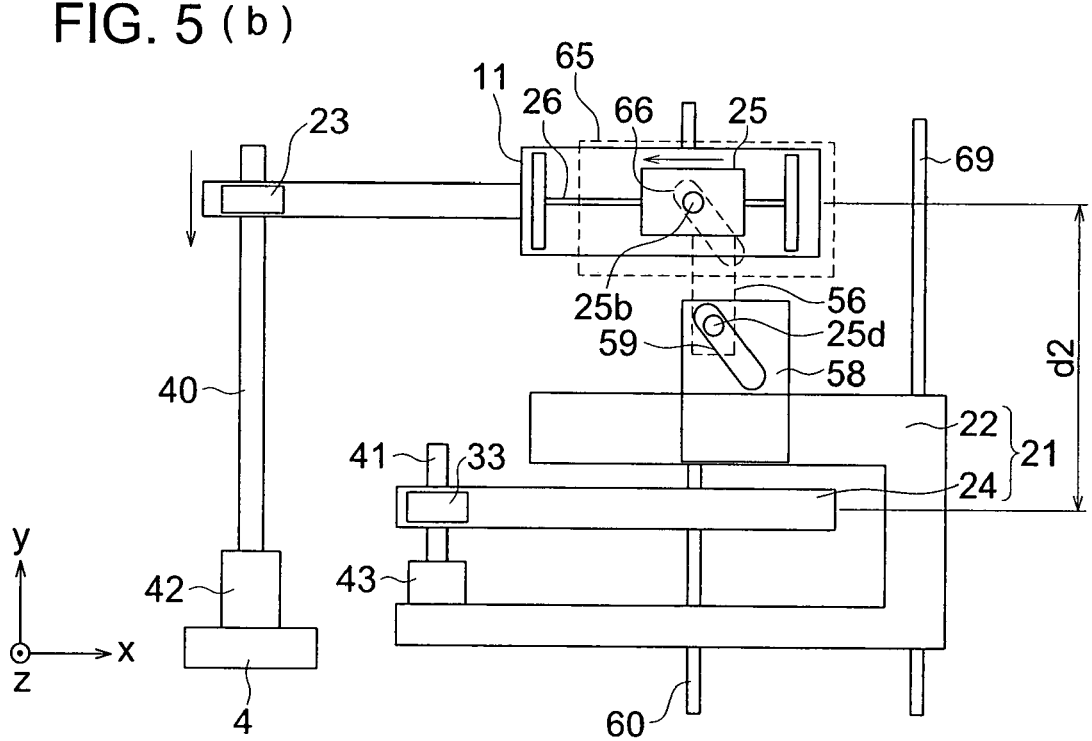

FIGS. 5(a) and 5(b) are illustrations for explaining the movement of the first lens frame 11 and second lens frame 21 at the time of zooming by the lens drive mechanism of the second embodiment. FIG. 5(a) shows the state at the wide end and FIG. 5(b) shows the state at the telephoto end.

The second cam pin 25d (may be referred to as a second cam follower) is provided on a projection 56 of the movable member 25. When the second cam pin 25d moves, a cam plate 58 provided on the second lens frame 21 is structured so as to move the second lens frame 21 along the cam groove 59.

When zooming to the wide side, the first lens frame 11 moves in the direction of the arrow of FIG. 5(b), that is, in the negative direction of the Y-axis shown. Then, the first cam pin 25b of the movable member 25 moves in the positive direction of the X-axis along the cam groove 66, and the second cam pin 25d of the movable member 25 also moves in the positive direction of the X-axis. When the second cam pin 25d moves, the cam plate 58 installed on the second lens frame 21 moves along the cam groove 59, and the second lens frame 21 moves in the positive direction of the Y-axis with respect to the first lens frame 11. At this time, the distance between the lens centers of the first moving lens group 10 and second moving lens group 20 is d1.

When zooming to the telephoto side, the first lens frame 11 moves in the direction of the arrow of FIG. 5(a), that is, in the positive direction of the Y-axis shown. Then, the first cam pin 25b of the movable member 25 moves in the negative direction of the X-axis along the cam groove 66, and the first cam pin 25d of the movable member 25 also moves in the negative direction of the X-axis. Then, since the second cam pin 25d moves, the cam plate 58 provided on the second lens frame 21 moves along the cam groove 59, and the second lens frame 21 moves in the negative direction of the Y-axis with respect to the first lens frame 11. At this time, the distance between the lens centers of the first moving lens group 10 and second moving lens group 20 is d2, which is longer than the distance d1 on the wide side.

As mentioned above, the first sliding contact portion 25a and second sliding contact portion 22a of the movable member 25 slide, thus the distance between the lens centers of the first moving lens group 10 and second moving lens group 20 is changed, thus the zooming magnification can be changed only by moving the first moving lens group 10. Further, in this embodiment, the coil spring 45 for biasing the first lens frame 11 and second lens frame 21 in the direction for permitting both to approach each other is not used, though it may be used to suppress the looseness between the second cam pin 25d and the cam groove 59. Further, when using the coil spring 45, an end face cam may be used instead of the cam groove 59.

Further, in this embodiment, the cam pin 25d is provided on the movable member 25 and the cam groove is formed in the cam plate 58 provided on the second lens frame 21, though it is possible to form a cam groove or an end face cam on the movable member 25 and install a cam pin on the second lens frame 21.

Here, the drive principle of the rod 40 which is a drive shaft for driving the first moving lens group 10 will be described.

The graph of the voltage waveform for driving the piezo element shown in FIG. 6 and the graph of the moving speed of the rod shown in FIG. 7 will be described.

Figure 6:
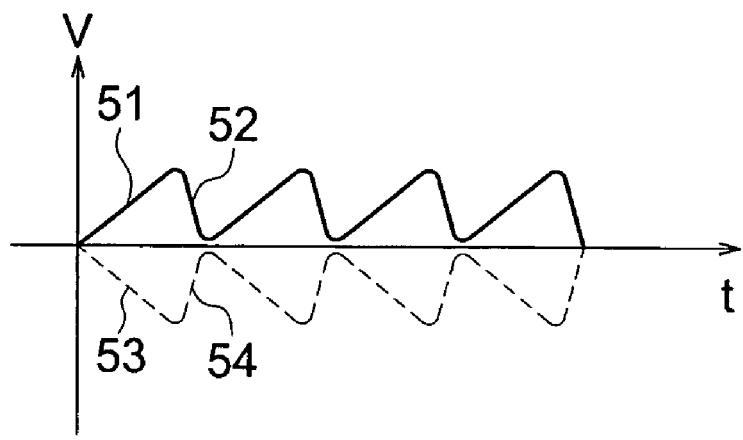
FIG. 6 is a diagram showing a graph of the voltage waveform for driving the piezo element.
Figure 7:
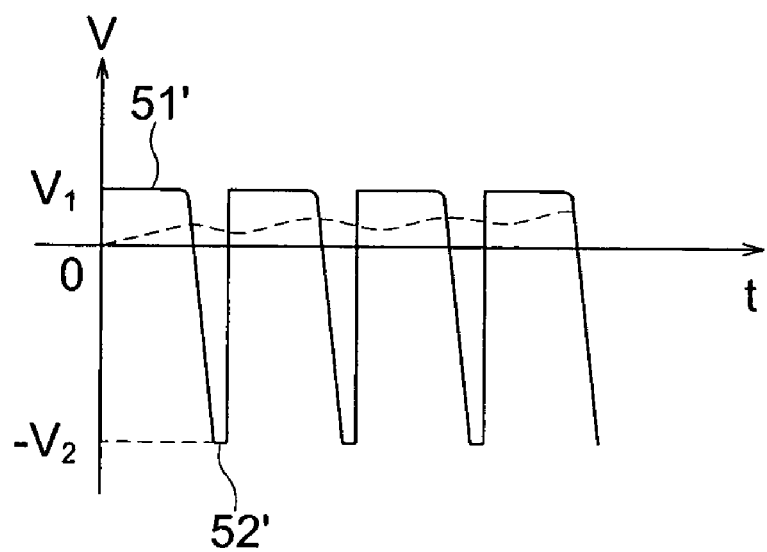
FIG. 7 is a diagram showing a graph of the moving speed of the rod.

When impressing continuously a fluctuating voltage expressed in a saw tooth waveform as shown by the solid line in FIG. 6 to the piezo element 42, the piezo element 42 vibrates in expansion and contraction motion, and the rod 40 vibrates in the longitudinal direction thereof in correspondence with the vibration. FIG. 7 is a graph showing the moving speed of the rod 40 at this time. In FIG. 7, the speed when the rod 40 moves in the positive direction of the Y-axis is assumed as positive.

For a slowly rising slope 51 in the voltage waveform shown by the solid line in FIG. 6, the piezo element 42 expands comparatively slowly and the rod 40 slowly moves in the positive direction of the Y-axis. Further, for a sudden falling slop 52, the piezo element 42 contracts rapidly and is returned to its initial length and the rod 40 moves suddenly in the negative direction of the Y-axis. When continuously impressing a voltage so as to repeat the similar waveform, the rod 40 vibrates by repeating slow movement (speed V1 shown in FIG. 7) in the positive direction of the Y-axis and sudden movement (speed −V2 shown in FIG. 7) in the negative direction of the Y-axis.

Here, the spring force for pressing the compression plate 23 (frictional binding force for the compression plate 23 and rod 40 of the first lens frame 11) is adjusted so that when the rod 40 moves slowly, the first lens frame 11 moves together with the rod 40, and when the rod 40 moves suddenly, the first lens frame 11 stay there by inertia (or move in a smaller amount than that of the rod 40). Therefore, during vibration of the rod 40, the first lens frame 11 moves relatively in the positive direction of the Y-axis to the fixed frame 4 (the speed of the first lens frame 11 at this time is shown by the dashed line in FIG. 6). When moving the first lens frame 11 in the negative direction of the Y-axis, it is desirable to impress continuously a fluctuating voltage having a slowly falling slope 53 and a suddenly rising slope 54 as shown by the dashed line in FIG. 7.

The amplitude of the rod 40 is very small, so that the movement distance of the first lens frame 11 corresponding to a one-pulse of voltage is very small, thus the position of the lens group can be controlled precisely.

Figure 8:
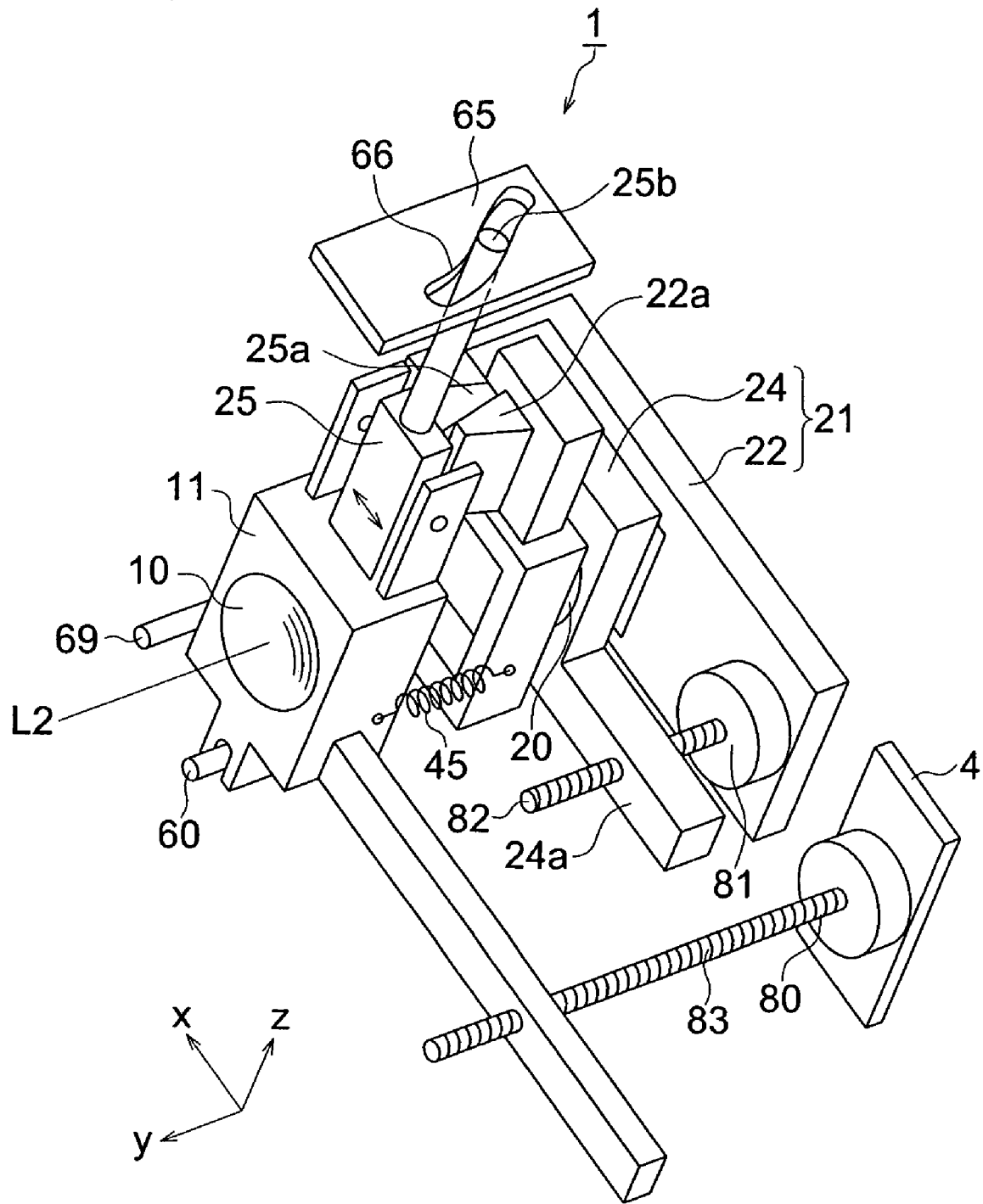
FIG. 8 is a diagram showing a plan view of the main section of the lens barrel of a third embodiment of the present invention.

FIG. 8 is a perspective view of the main section of the lens barrel of the third embodiment of the present invention. The third embodiment is an example using a stepping motor as a driving section for driving independently the first lens frame 11 and the second lens frame 21. Other portions of the mechanism are exactly the same as those of the first embodiment, so that the same numerals are assigned to the components having the same functions, and the explanation thereof will be omitted.

Numerals 80 and 81 shown in FIG. 8 indicate stepping motors and 82 and 83 indicate feed screws. The first lens frame 11 and second lens frame 21 are equipped with nuts and can move in the direction of the optical axis L2 (the Y-axis direction) by the rotary motion of the feed screws. In this way, the rotary motions of the stepping motors 80 and 81 are converted to straight motions in the direction of the optical axis L2 (the Y-axis direction) by the feed screws 82 and 83. Further, when the rotations of the stepping motors 80 and 81 are decelerated by gear trains to drive the feed screws 82 and 83, the lens frames can be moved more precisely.

Figure 9:
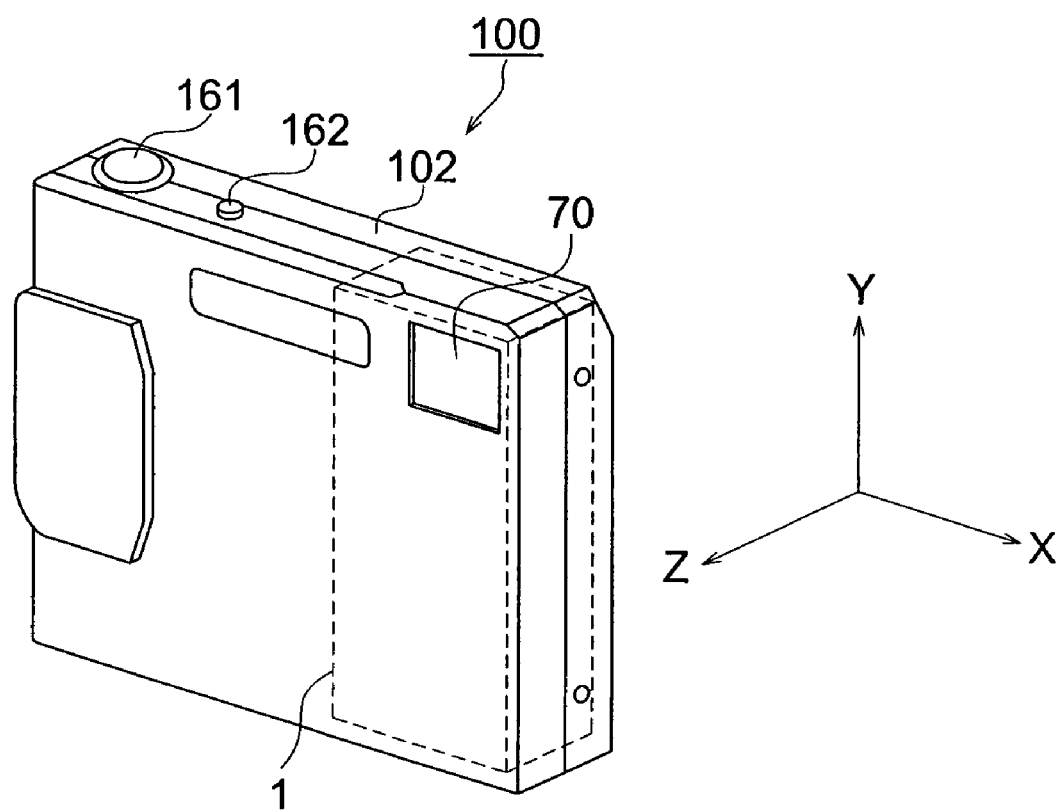
FIG. 9 is a diagram showing an external view showing an example of a camera 100 having a lens barrel 1 relating to the present invention.

FIG. 9 is an external view showing an example of the camera 100 having the lens barrel 1 relating to the third embodiment of the present invention. FIG. 9 is a perspective view of the front of the camera 100.

In FIG. 9, numeral 1 shown by the dotted line indicates a lens barrel described in the third embodiment and expresses the state that the lens barrel 1 is incorporated in a main unit 102 of the camera. Numeral 161 indicates a release button, and 162 indicates a power switch. In conjunction with the power switch 162, the camera 100 enters the startup state. By pressing the first step of the release button 161, the image pickup preparation operation, that is, the focusing operation and photometry operation of the camera 100 are performed, and by pressing the second step, the image pickup operation is performed.

Figure 10:
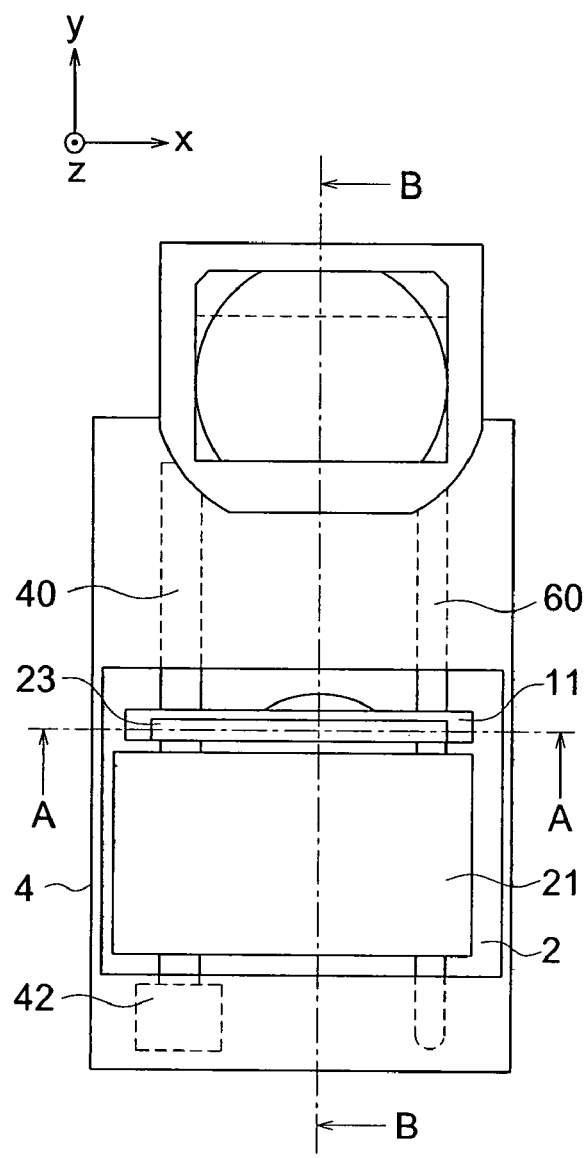
FIGS. 10(a) and 10(b) are drawings of the lens barrel 1 of a fourth embodiment of the present invention.
Figure 10:
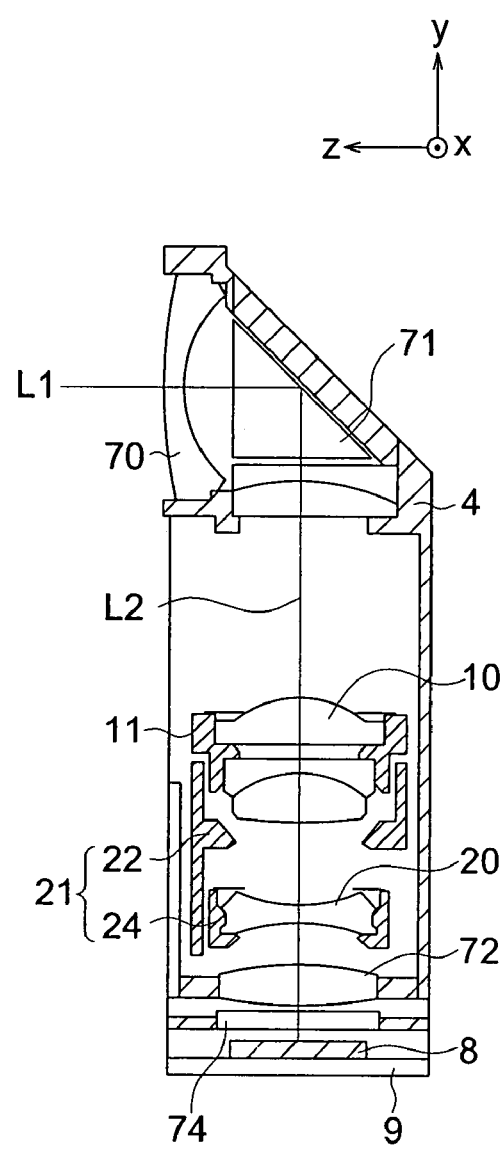

FIGS. 10(a) and 10(b) are diagrams showing the lens barrel 1 of the fourth embodiment of the present invention. FIG. 10(a) is an external plan view of the lens barrel 1, and FIG. 10(b) is a cross sectional view viewed from the section B-B shown in FIG. 10(a). In the following explanation, the direction is indicated by properly using the three-dimensional orthogonal coordinate system of X, Y, and Z shown in FIG. 1. The operation principle of the lens drive mechanism is exactly the same as that of the first embodiment, so that the same numerals are assigned to the components having the same functions, and the explanation thereof will be omitted.

The internal constitution of the lens barrel 1 will be described by referring to FIG. 10(b). FIG. 10(b) is a front view of the lens barrel 1 shown in FIG. 1 when it is viewed in the Z direction.

In FIG. 10(b), numeral 10 indicates the first moving lens group, and 20 the second moving lens group, 70 a first fixed lens, 71 a prism, and 72 a second fixed lens, and the imaging optical system is formed of the two moving lens groups and fixed optical parts. The light flux entering from the fixed lens 70 is bent by the prism 71 in the negative direction of the Y-axis and is focused on the image pickup surface of an image pickup element 8 by the first moving lens group 10, second moving lens group 20, and second fixed lens 72. In front of the image pickup surface of the image pickup element 8 is arranged an optical filter 74 comprised of an infrared ray cut filter or a laminate of the infrared cut filter and an optical low-pass filter. An image pickup element substrate 9 for loading the image pickup element 8 and a circuit for driving the image pickup element 8 is fixed to the fixed frame 4.

Further, on the fixed frame 4, a first photointerrupter 213 not drawn for detecting the initial position of the first lens frame 11 is installed. When the first lens frame 11 moves to the initial position, a part of the first lens frame 11 interrupts the light flux of the first photointerrupter 213 and generates a signal.

Further, a photoreflector (not drawn) is fixed on the inner surface of the fixed frame 4, and a reflector (not drawn) is fixed at the position opposite to the photoreflector on the first lens frame. On the reflector, a predetermined pattern is formed at each of the reflection portion and non-reflection portion, and when the first lens frame 11 moves, the pattern is read by the photoreflector, and the movement distance or position of the first lens frame 11 in the direction of the optical axis L2 is detected. Further, the pattern is formed uniformly and finely, and a digital signal is obtained by the processing circuit. Further, by also using information of a piezo element drive pulse of higher resolution than the pattern, and by accumulating the impressed pulse number from the initial position detected by the first photointerrupter, a highly precise position can be detected not depending on the rod position nor environmental temperature.

Further, in the embodiment aforementioned, the photoreflector is used to detect the position of the first lens frame 11, though the present invention is not limited to it, and any digital position detection element (for example, a photointerrupter) is acceptable. By combining the digital position detection element and accumulation of pulses to the piezo element, even if the movement distance of the first lens frame 11 is long and the detection stroke is large, the position detecting section can be prevented from being enlarged.

Further, the pattern may be divided into a plurality of areas formed of reflection portions and non-reflection portions. In this case, by use of the piezo element drive pulse, it is possible to recognize the pattern and set the zoom position. By doing this, even if the lens stop position becomes unstable due to disturbance, the lens can be moved to its target position without a runaway, and the apparatus will not easily enter an imaging impossible state.

In this embodiment, the optical axis L1, where the light flux enters from the first fixed lens 70 and is bent by the prism 71, is in the direction of the Z-axis, and the optical axis L2, where the light flux is bent by the prism 71 and is focused on the image pickup element 8, is in the direction of the Y-axis. The prism 71 is a reflection member of the present invention. Hereinafter, with respect to the movement directions of the first moving lens group 10 and second moving lens group 20, the positive direction of the Y-axis is called an objective side, and the negative direction of the Y-axis is called an image surface side.

Further, in the embodiment of the present invention, an imaging optical system using a bending optical system suitable for miniaturization as an optical device will be described, though the present invention is not limited to the imaging optical system using the bending optical system. Further, an example using a prism will be described as a reflection element, though the present invention is not limited to the prism, and a plate-like mirror may be used.

Figure 11:
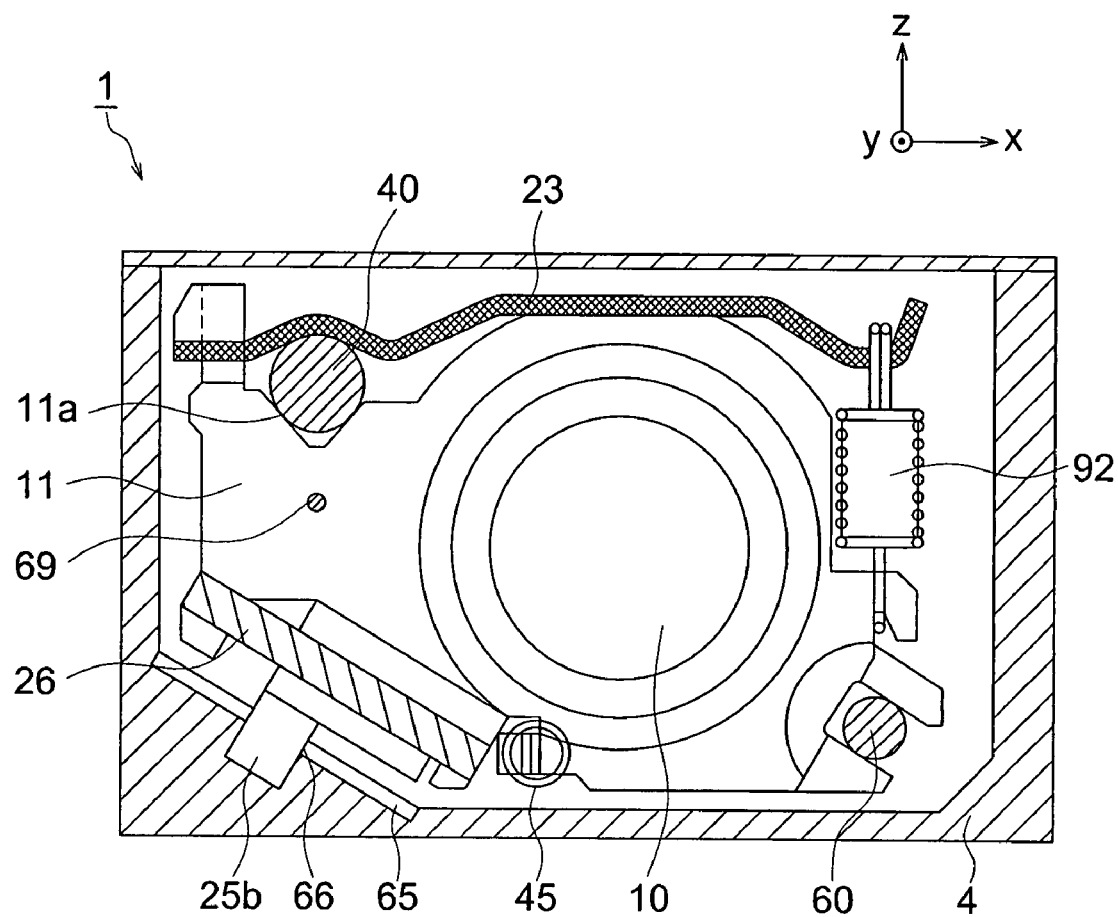
FIG. 11 is a diagram showing a cross sectional view viewed from the section A-A shown in FIG. 10(a).

FIG. 11 is a cross sectional view viewed from the section A-A shown in FIG. 10(a). The main section of the first lens frame 11 will be described by referring to FIG. 11.

The rod 40 is pressed by the compression plate 23 biased by a tension spring 92 so as to make a contact with the contact portion 11a of the first lens frame 11. By doing this, the rod 40 is frictionally engaged to the first lens frame 11. Further, the first lens frame 11 is held by the guide 60 and can move in the direction of the optical axis L2.

A sub-guide shaft 69 extended toward the second lens frame 21 is fixed To the first lens frame 11 and controls the rotation of the second sliding contact portion moving frame 22 and lens moving frame 24. By doing this, the sub-guide shaft can be shortened, compared to the constitution of holding by the fixed frame 4.

The movable member 25 is attached to the first lens frame 11 by a movable member shaft 26 and can move along the movable member shaft 26. The first cam pin 25b is engaged to the cam groove 66 of the cam plate 65. Further, in FIG. 11, the cam plate 65 is provided, however, the cam groove 66 may be formed on the fixed frame 4. Further, the cam groove 66 may be an end face cam, thus can be easily installed integrally with the fixed frame 4.

In this embodiment, the movable member shaft 26 is attached obliquely to the outer peripheral surface of the lens barrel 1. By this arrangement, the long movable member shaft 26 can be arranged efficiently, and the movement distance of the first cam pin 25b can be increased. Since the movement distance of the first cam pin 25b is long like this, so that the movement of the first cam pin 25b can be converted precisely to a movement of the second lens frame 21 in the direction of the optical axis L2. Further, the first cam pin 25b can be arranged in the corner of the box-shape, which contributes to thinning. If the movable member shaft 26 were arranged in the direction of the optical axis L1, the movement distance of the cam pin 25b would be made smaller, and if it were arranged in the direction perpendicular to the optical path L1, the cam pin 25b would be projected from the outer peripheral surface of the fixed frame 4, and it would cause an obstacle to realization of thinning.

Figure 12:
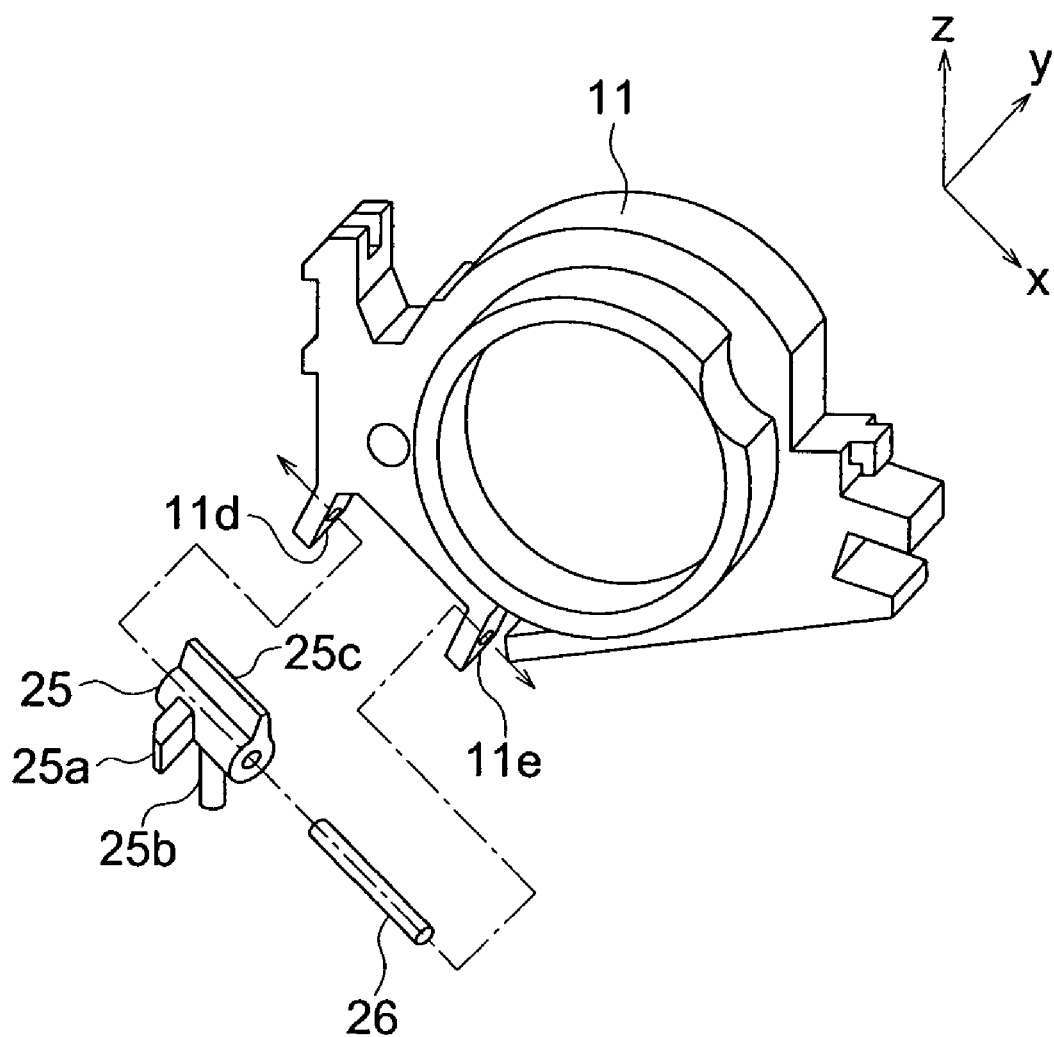
FIG. 12 is a diagram showing a perspective view of a first lens frame 11.

FIG. 12 is a perspective view of the first lens frame 11. As shown in FIG. 12, the movable member 25 permits the movable member shaft 26 to pass through the shaft hole, and the movable member shaft 26 is fixed to holes 11d and lie. The first lens frame 11 has a rotation-stop slit not drawn, and a rotation stopper 25c of the movable member 25 moves along the rotation-stop slit. By doing this, the movable member 25 is structured so as not to rotate. The movable member 25 is very small, so that even if it is located in the vicinity of the lens, it emits no harmful light by the inner-surface reflection and can be arranged easily at a part of the first lens frame 11.

Figure 13:
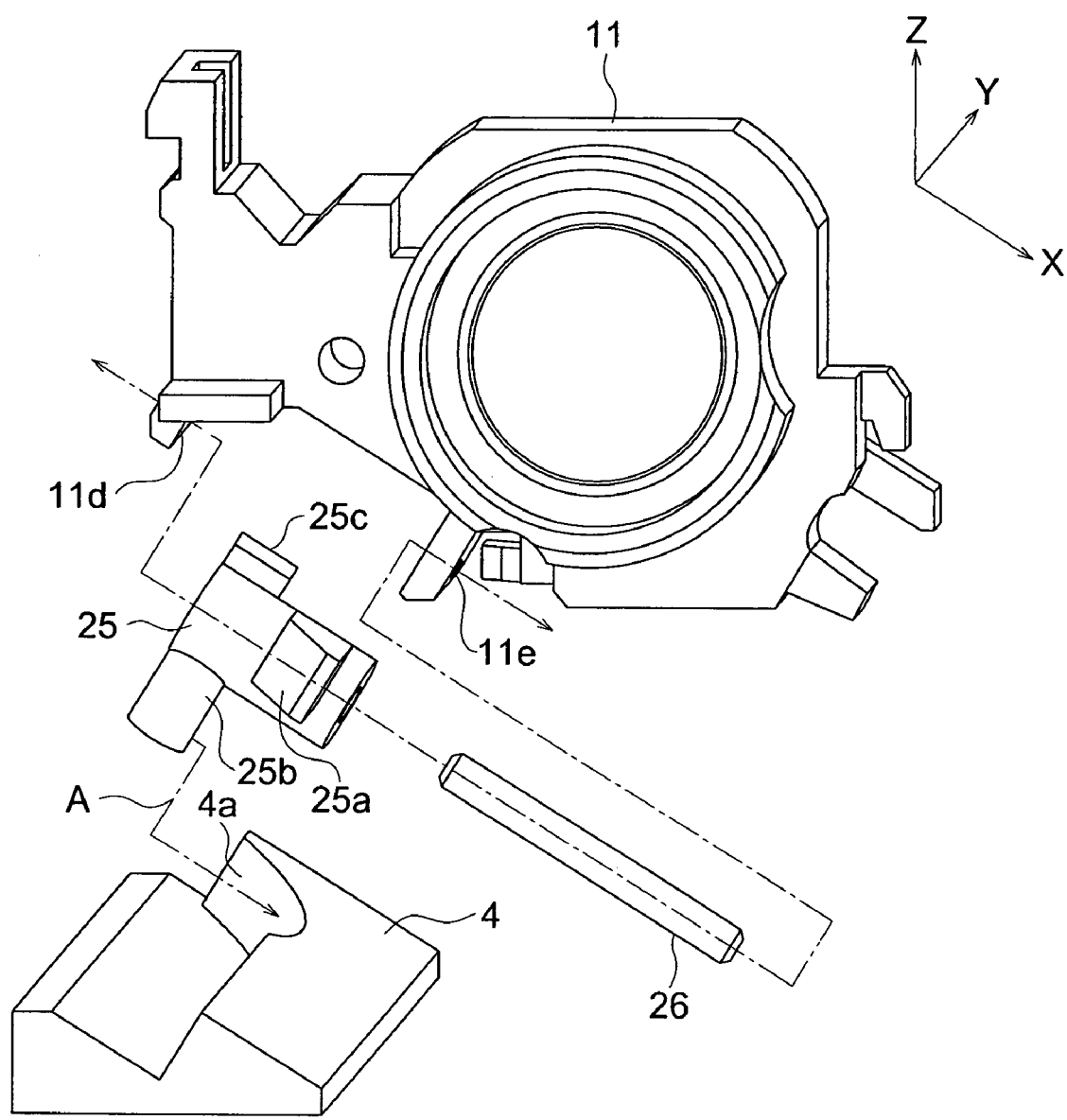

FIG. 13 is a perspective view for describing an example of the end face cam 4a in place of the cam groove 6. As shown in FIG. 13, the end face cam 4a is provided on one part of the fixed frame 4. Further, in FIG. 13, only the part of the fixed frame 4 where the end face cam 4a is provided is illustrated.

Next, the assembling procedure and operation of the first lens frame 11 will be described. After the first cam pin 25b is attached to the first lens frame 11 in the procedure described in FIG. 12, the first lens frame 11 is incorporated into the fixed frame 4. The end face cam 4a, as shown by the arrow A in FIG. 13, is arranged at the position where the side of the first cam pin 25b can make a contact with the cam surface of the end face cam 4a. Next, the first lens frame 11 and second lens frame 21 are biased by the coil spring 45 not drawn in the direction to make a contact with each other. By this biasing force, the first sliding contact portion 25a of the movable member 25 and the second sliding contact portion 22a of the second lens frame 21 slide on the sliding contact surface, and the movable member 25 is given a component of the force so as to move along the movable member shaft 26 in the positive direction of the X-axis. By the component of the force in the positive direction of the X-axis given to the movable member 25, the side of the first cam pin 25b makes a pressure contact with the end face cam 4a. When the first lens frame 11 moves in the Y-axis direction, the first cam pin 25b slides on the end face cam 4a, and the movable member 25 moves in the X-axis direction according to the shape of the cam surface.

Figure 14:
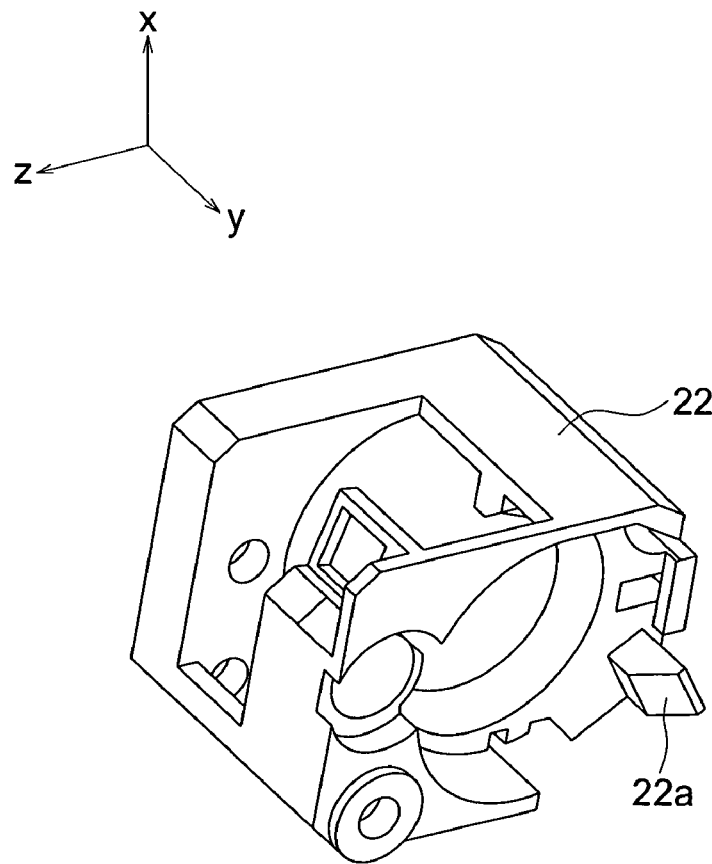
FIG. 14 is a diagram showing a perspective view of a second sliding contact portion moving frame 22.

FIG. 14 is a perspective view of the second sliding contact portion moving frame 22.

The second sliding contact portion 22a is arranged on the second sliding contact portion moving frame 22 at the position corresponding to the first sliding contact portion 25a. As shown in the FIG. 14, the second sliding contact portion 22a is very small and can be arranged easily at one part of the second sliding contact portion moving frame 22.

Figure 15:
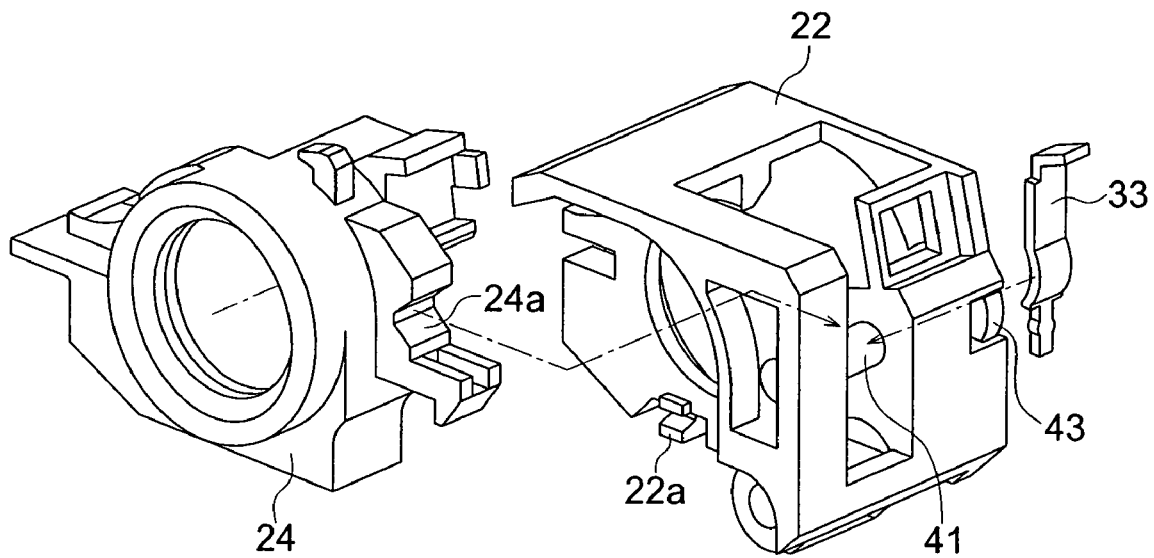
FIG. 15 is an illustration for explaining the connection condition of the second sliding contact portion moving frame 22 and a lens moving frame 24.

FIG. 15 is an illustration for describing the connection condition of the second sliding contact portion moving frame 22 with the lens moving frame 24.

As shown in FIG. 15, one end of the rod 41 is adhered to the piezo element 43, and the other end of the piezo element 43 is fixed to the second sliding contact portion moving frame 22, and the lens moving frame 24 is frictionally jointed to the rod 41 by a compression plate 33 and a tension spring which is not shown. Further, a second photointerrupter (not shown in FIG. 15, and shown in FIG. 16 at numeral 214) for detecting the initial position of the lens moving frame 24 is provided on the second sliding contact portion moving frame 22. When the lens moving frame 24 moves to the initial position, a part of the lens moving frame 24 interrupts the light flux of the second photointerrupter 214 and generates a signal. Further, the photointerrupter 214 is electrically connected by the fixed frame 4, and the connection wire is connected so as not to disturb the driving for the second lens frame 21.

As mentioned above, in this embodiment, the position of the lens moving frame 24 with respect to the second sliding contact portion moving frame 22 is detected, and the photointerrupter 214 may be arranged in the fixed frame 4. By doing this, the arrangement space of the connection wire can be made smaller, and the actuator can be prevented from being enlarged due to reduction in the drive resistance. Furthermore, it is possible to structure so as to interrupt the light flux of the photointerrupter 213 by a part of the lens moving frame 24 to detect the initial positions of the first lens frame and second lens frame by the same detection element without installing the photointerrupter 214. By doing this, an inexpensive and small lens barrel can be provided.

In that case, the photointerrupter 213 is arranged between the light shield portion of the first group lens frame 11 and the light shield portion of the lens moving frame 24, and at the point of time when a signal of the photointerrupter 213 is generated after driving the rod 40, the initial position of the first lens frame 11 is reset, and simultaneously, the first lens frame 11 is driven for the telephoto side to the position where there is no interference even if the light shield portion of the second lens frame is moved to the position where it passes the photointerrupter 213. Finally, at the point of time when a signal of the photointerrupter 213 is generated after driving the rod 41, the initial position of the lens moving frame 24 is reset.

In the aforementioned constitutions, a digital position detection element is used, though a constitution using an analog position detection element is acceptable. A concrete constitution will be described below.

In place of the photointerrupter 214, a hall element connected electrically from the fixed frame 4 is fixed to the second sliding contact portion moving frame 22, and a magnet is fixed to the position opposite to the hall element of the lens moving frame 24, and the connection wire to the hall element is connected so as not to disturb the driving for the second lens frame 21. In correspondence with the movement of the lens moving frame 24, the output of the hall element is changed, and the position of the lens moving frame 24 to the second sliding contact portion moving frame 22 is detected. Further, the second sliding contact portion moving frame 22 can detect highly precisely the positions of the first lens frame 11 and second lens frame 21 since the position thereof to the first lens frame 11 is decided uniquely via the movable member 25. Further, the hall element is arranged in the second sliding contact portion moving frame 22, thus the necessary detection range can be made smaller, and the contribution to realization of miniaturization of the lens barrel 1 is high due to realization of miniaturization of the hall element itself. On the other hand, when the hall element is arranged in the fixed frame, the detection stroke is extended over a wide range, so that reduction in the detection precision and enlargement of the hall element cannot be avoided.

As mentioned above, by executing scale detection by the initial position detection element and a digital position detection element as position detection of the first lens frame 11 and by accumulating a detection signal from the initial position, it is possible to configure so that the position of the first lens frame 11 can be estimated, and the position of the lens moving frame 24 with respect to the first lens frame 11 can be detected by a component comprised of the movable member 25 and the hall element installed in the second sliding contact portion moving frame 22. By doing this, the interval between the first moving lens group 10 and the second moving lens group 20, which requires more precise detection, can be detected by a highly precise and small analog position detection element because of the small detection range. Further, in the same constitution, even if the movement distance of the first lens frame 11 is long, the detection element will not be enlarged.

Next, the zoom tracking will be described. A camera controller (not shown in FIG. 15, and shown in FIG. 16 at numeral 107) refers to the data of the zoom tracking curve stored in a memory (indicated at numeral 127 in FIG. 16) and controls the second lens frame 21 so as to move to the position of the first lens frame 11. In this case, by use of the aforementioned constitution, the focal point can be kept fixed during zooming, and even if the view angle is changed, the focus is always kept in focus, and the photographing is not disturbed. Further, in this embodiment, the shape of the cam groove 66 is set so as to change the interval between the first lens frame 11 and the second sliding contact portion moving frame 22 in accordance with the zoom tracking curve at the infinite distance, though it may be set in accordance with the zoom tracking curve at an optional finite distance.

As indicated by the dotted line and arrow in FIG. 15, the second sliding contact portion moving frame 22 and the lens moving frame 24 are engaged so as to permit a contact portion 24a of the lens moving frame 24 to make a contact with the rod 41. As indicated by the dotted line and arrow in FIG. 15, a compression plate 33 makes a contact with the side of the rod 41 opposite to the contact portion 24a. The lower end of the compression plate 33 is engaged to the hole of the second sliding contact portion moving frame 22, and the other end is biased by a coil spring not drawn so as to bias the rod 41.

Further, the incorporation into the fixed frame 4 is carried out when the second sliding contact portion moving frame 22 and lens moving frame 24 are connected, and the sub-guide shaft 69 fixed to the first lens frame 11 and the movable member 25 are engaged being supported by the guide 60.

Figure 16:
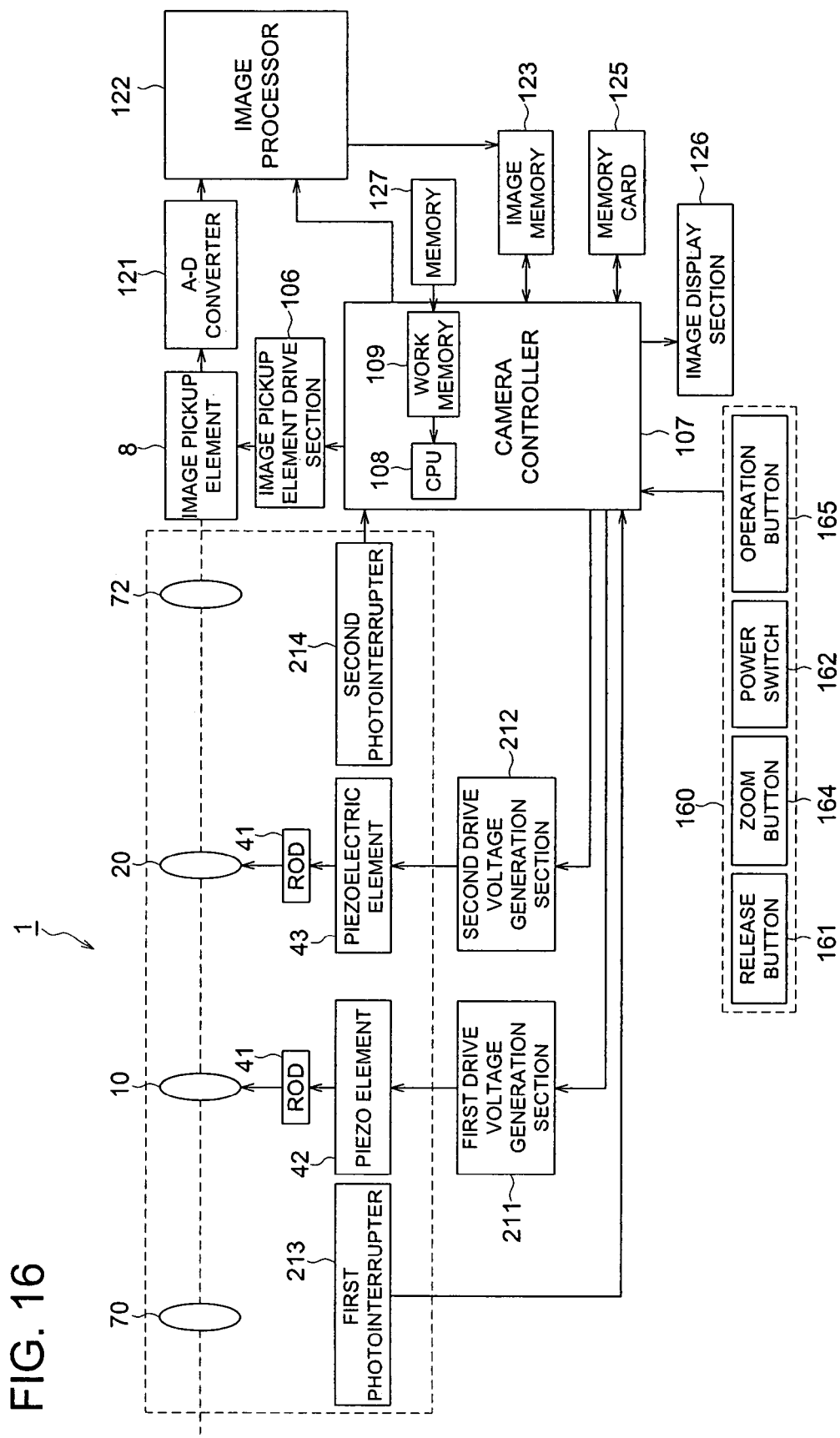
FIG. 16 is a diagram showing a block diagram of the circuit of the camera 100 for functioning as an image pickup apparatus relating to an embodiment of the present invention.

FIG. 16 is a block diagram of the circuit of the camera 100 for functioning as an image pickup apparatus according to the present invention. In the drawing, the same numerals are assigned to the same functional members as those described previously.

The camera controller 107 which is a control section of this embodiment is comprised of a CPU (central processing unit) 108 and a work memory 109, reads a program stored in the memory 127 into the work memory 109, and controls centrally each section of the camera 100 including the lens barrel 1 and the lens group of the lens barrel according to the concerned program.

Further, the camera controller 107 receives input signals from a release button 161, a power switch 162, a zoom button 164, and an operation button 165 which are provided in an operation section 160, controls the whole camera 100, controls a power source not drawn, thereby supplies power to each section of the camera.

The camera controller 107 controls the sequence relating to imaging. The camera controller 107 controls the image pickup operation of the image pickup element 8 via a CCD drive section 106. Further, the image pickup element in this embodiment may be a solid-state image pickup element such as a CMOS sensor or a CID sensor instead of the CCD. An image of an analog signal obtained by the image pickup element 8 is converted to a digital signal by an A-D converter 121 after being subjected to a noise reduction process, thus image digital signals are sequentially outputted to an image processing unit 122.

The image processing unit 122 has the image processing functions such as gamma correction, contour correction, and image compression. These image processes are performed by an instruction of the camera controller 107. The camera controller 107 performs the image processes for the image output from the image pickup element 8, records once in an image memory 123, and displays it on an image display section 126. When the release button 161 is turned on, the image output from the image pickup element 8 is subjected to the image processes, then is recorded once in the image memory 123, and is recorded finally in a memory card 125.

Next, the control for the lens barrel 1 will be described.

A first drive voltage generation section 211 and a second drive voltage generation section 212, depending on a control signal from the camera controller 107, generate a fluctuating voltage expressed in a saw tooth waveform as described in FIG. 6. When the power switch 162 is turned on, the camera controller 107 gives the control signal for driving in the negative direction of the Y-axis to the first drive voltage generation section 211 and second drive voltage generation section 212 so as to return the first lens frame 11 and second lens frame 21 to their initial positions.

The piezo element 42 given the fluctuating voltage from the first drive voltage generation section 211 drives the rod 40 and moves the first lens frame 11 in the negative direction of the Y-axis. The camera 107, upon receipt of a detection signal of a first photointerrupter 213, stops the signal generation of the first drive voltage generation section 211. The same may be said with the second drive voltage generation section 212.

Next, the camera controller 107, by counting the number of generated signals in a saw tooth wave form, moves the first lens frame 11 to the target position. The second lens frame 21 moves together with the first lens frame 11 since joined to the first lens frame 11 by the coil spring 45, and according to the movement of the movable member 25, the interval between the first lens frame 11 and itself is changed.

During imaging, the camera controller 107, on the basis of the pint information and exposure information obtained from the image output of the image pickup element 8, controls the piezo element 42 via the second drive voltage generation section 212 and moves the lens moving frame 24 to a predetermined position. Further, the camera 107 controls the shutter speed of the image pickup element 8.

The camera controller 107 displays the live view of the image picked up by the image pickup element 8 on the image display section 126 according to the setting of the operation button 165, displays the image recorded in the image memory 123 on the image display section 126 as an after-view, and displays the image recorded in the memory card 125 on the image display section 126 as a reproduced image.

According to the embodiments of the present invention, by the movable member held by the first lens frame so as to move in the direction perpendicular to the optical axis, the second lens frame is moved, so that by use of a small and light constitution, in correspondence with movement of one lens group, the other lens group can be moved.

As mentioned above, according to the embodiments of the present invention, in correspondence with movement of one lens group, the other lens group can be moved, so that a small and light lens barrel and a small and light image pickup apparatus can be provided.

What is claimed is:

1. A lens barrel comprising:
   an image pickup optical system; the optical system including:
      a first lens group; and
      a second lens group,
   a first lens frame for holding the first lens group, the first lens frame being able to move in a direction of an optical axis of the first lens group;
   a second lens frame for holding the second lens group, the second lens frame being able to move in the direction of the optical axis; and
   a movable member which is slidably held by the first lens frame, is coupled to the second lens frame by a cam mechanism, wherein said movable member is configured to slidably move along a straight line in a direction perpendicular to the optical axis and to cause, through the cam mechanism, the second lens frame to move along the optical axis.

2. The lens barrel of claim 1, further comprising:
   a first cam for moving the movable member following a movement of the first lens group,
   wherein the movable member includes a first cam follower configured to slidably contacting the first cam.

3. The lens barrel of claim 2, wherein the first cam includes a cam groove, and the first cam follower includes a pin.

4. The lens barrel of claim 2, wherein the first cam includes an end face cam, and the first cam follower includes a pin.

5. The lens barrel of claim 2, wherein the lens barrel has a box shape, and the movable member is arranged with a moving direction thereof inclined with respect to an outer surface of the box shape, and the first cam is disposed at a corner portion of the box shape.

6. The lens barrel of claim 2, wherein the second lens frame includes:
   a lens moving frame which holds the second lens group;
   a movable frame which is coupled to the movable member by the cam mechanism; and
   a driving member which is provided on the movable frame to move the lens moving frame with respect to the movable frame.

7. The lens barrel of claim 1, further comprising:
   a biasing member which urges the first lens frame and the second lens frame in a direction toward each other;
   wherein the movable member includes a first slidable contact surface which is coupled to the second lens frame by the cam mechanism and is inclined with respect to the optical axis, and the second lens frame includes a second slidable contact surface which is coupled to the first lens frame by the cam mechanism, is inclined with respect to the optical axis, and slides on the first slidable contact surface following a motion of the movable member.

8. The lens barrel of claim 1, wherein as the cam mechanism, one of the movable member and the second lens frame includes a second cam and the other thereof includes a second cam follower which slidably contacts with the second cam.

9. The lens barrel of claim 8, the second cam includes a cam groove, and the second cam follower includes a pin.

10. The lens barrel of claim 8, the second cam includes an end face cam, and the second cam follower includes a pin.

11. The lens barrel of claim 1, wherein the first lens frame includes a guide member for slidingly guiding movement of the movable member along a straight line.

12. The lens barrel of claim 11, wherein the first lens frame includes a shaft as the guide member, and the shaft member is inserted through the movable member.

13. The lens barrel of claim 1, wherein the second lens frame includes:
   a lens moving frame which holds the second lens group;
   a movable frame which is coupled to the movable member by the cam mechanism; and
   a driving member which is provided on the movable frame to move the lens moving frame with respect to the movable frame.

14. The lens barrel of claim 1, wherein the lens barrel has a box shape, and the movable member is arranged with a moving direction thereof inclined with respect to a side of the box shape extending along an optical axis.

15. The lens barrel of claim 1, further comprising:
a first lens driving member for moving the first lens frame in the direction of the optical axis; the first lens driving member including:
 a driving force generation section which generates a driving force; and
 a driving force transfer section which transfers the driving force from the driving force generation section to the first lens frame through a friction force.

16. The lens barrel of claim 1, further comprising:
a first lens driving member for moving the first lens frame in the direction of the optical axis, the first lens driving member including:
 a stepping motor;
 a feed screw which is arranged coaxially with a rotation shaft of the stepping motor; and
 a female screw which is provided on the first lens frame for screwing with the feed screw.

17. An image pickup apparatus comprising:
An image pickup optical system for picking up an image of a subject; the optical system including:
 a first lens group; and
 a second lens group,
an image pickup device for converting the image of the subject formed by the image pickup optical system into an electrical signal; and
a lens barrel for holding the image pickup optical system; including:
a first lens frame for holding the first lens group, the first lens frame being able to move in a direction of an optical axis of the first lens group;
a second lens frame for holding the second lens group, the second lens frame being able to move in the direction of the optical axis; and
a movable member which is slidably held by the first lens frame, is coupled to the second lens frame by a cam mechanism, wherein said movable member is configured to slidably move along a straight line in a direction perpendicular to the optical axis and to cause, through the cam mechanism, the second lens frame to move along the optical axis.

18. The image pickup apparatus of claim 17, wherein the lens barrel further comprises:
a first cam which moves the movable member following a movement of the first lens group,
wherein the movable member includes a first cam follower slidably contacting the first cam.

19. The image pickup apparatus of claim 17, wherein the image pickup optical system includes a reflection member which bends and reflects a light beam from the subject.

20. The image pickup apparatus of claim 17, wherein the lens barrel has a box-like shape, and the movable member is arranged with a moving direction thereof inclined with respect to an outer surface of the box-like shape, wherein the first cam is disposed at a corner portion of the box-like shape.

21. The lens barrel of claim 1, wherein the first lens frame is driven to move in the direction of the optical axis to cause the movable member to move, and the movement of the movable member causes, through the cam mechanism, the second lens frame to move along the optical axis.

* * * * *